340-870.11 SR SS REFERENCE SEARCH ROOM
XR 3,034,100
May 8, 1962 F. W. BRIXNER 3,034,100
NORMALLY INACTIVE MULTIPLE STATION CODE COMMUNICATION SYSTEM
Filed May 27, 1959 6 Sheets-Sheet 1
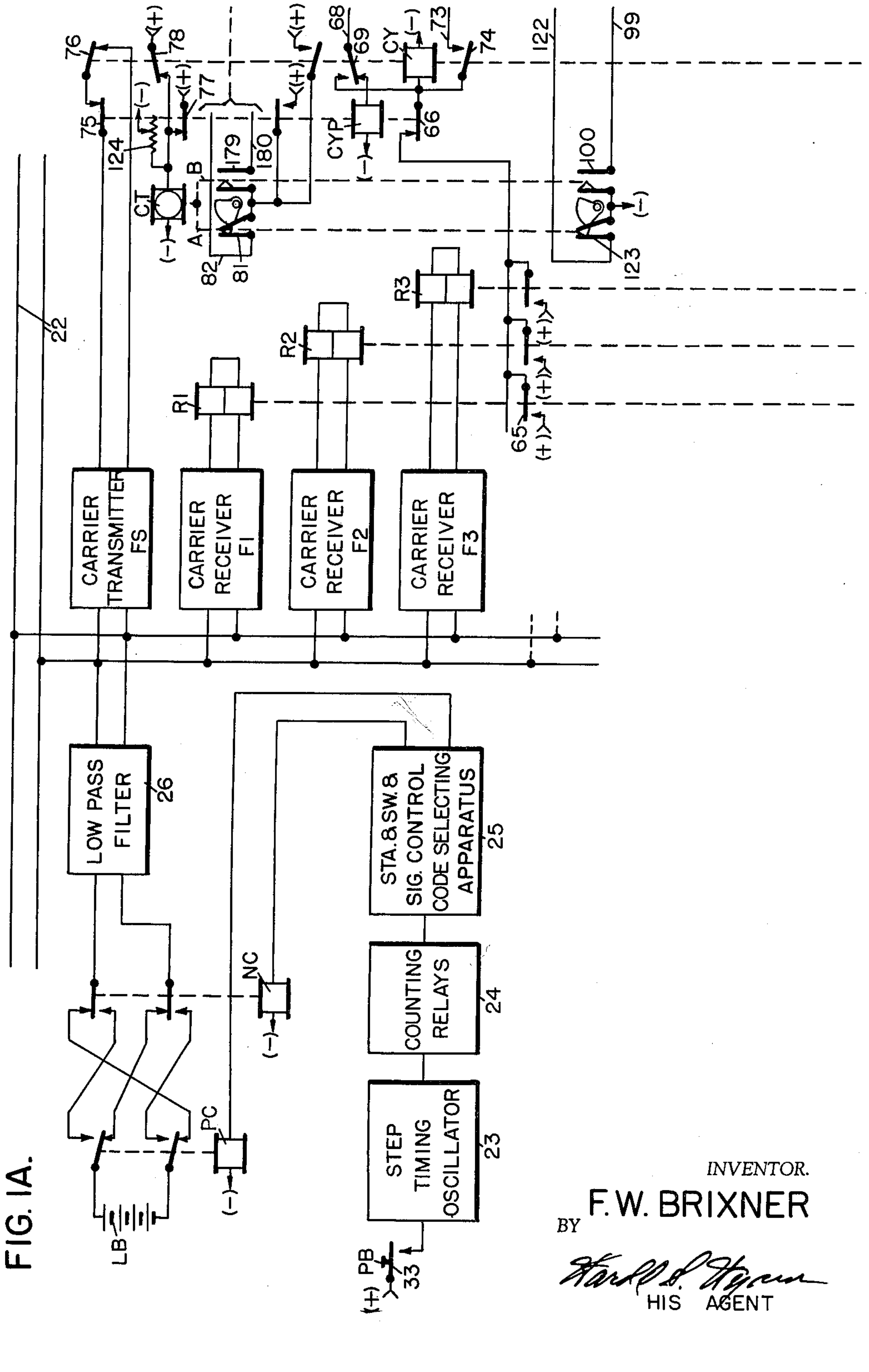
FIG. IA.
INVENTOR.
F. W. BRIXNER
BY [signature]
HIS AGENT
3034100
OR IN 340/163

May 8, 1962 F. W. BRIXNER 3,034,100

NORMALLY INACTIVE MULTIPLE STATION CODE COMMUNICATION SYSTEM

Filed May 27, 1959 6 Sheets-Sheet 2

NORMALLY INACTIVE MULTIPLE STATION CODE COMMUNICATION SYSTEM

Filed May 27, 1959

COUNTING SEQUENCE TABLE

| STEPS | CT | C1 | C2 | C3 | C4 |
|---|---|---|---|---|---|
| 1 | B | ← | → | → | → |
| 2 | A | ← | ← | → | → |
| 3 | B | ← | ← | ← | → |
| 4 | A | ← | → | ← | → |
| 5 | B | ← | → | ← | ← |
| 6 | A | ← | ← | ← | ← |
| 7 | B | ← | ← | → | ← |
| 8 | A | ← | → | → | ← |
| 9 | B | → | → | → | ← |
| 10 | A | → | ← | → | ← |
| 11 | B | → | ← | ← | ← |
| 12 | A | → | → | ← | ← |
| 13 | B | → | → | ← | → |
| 14 | A | → | ← | ← | → |
| 15 | B | → | ← | → | → |
| 16 | A | → | → | → | → |

INVENTOR.
F. W. BRIXNER
BY [signature]
HIS AGENT

NORMALLY INACTIVE MULTIPLE STATION CODE COMMUNICATION SYSTEM

Filed May 27, 1959 6 Sheets-Sheet 4

INVENTOR.
BY F. W. BRIXNER
HIS AGENT

May 8, 1962 F. W. BRIXNER 3,034,100

NORMALLY INACTIVE MULTIPLE STATION CODE COMMUNICATION SYSTEM

Filed May 27, 1959 6 Sheets-Sheet 5

INVENTOR.
F. W. BRIXNER
BY
HIS AGENT

May 8, 1962 F. W. BRIXNER 3,034,100

NORMALLY INACTIVE MULTIPLE STATION CODE COMMUNICATION SYSTEM

Filed May 27, 1959 6 Sheets-Sheet 6

INVENTOR.

F. W. BRIXNER

BY [signature]

HIS AGENT 3,034,100
NORMALLY INACTIVE MULTIPLE STATION CODE COMMUNICATION SYSTEM

Frederick W. Brixner, Rochester, N.Y., assignor to General Railway Signal Company, Rochester, N.Y.
Filed May 27, 1959, Ser. No. 816,293
11 Claims. (Cl. 340—163)

Figure 1B:
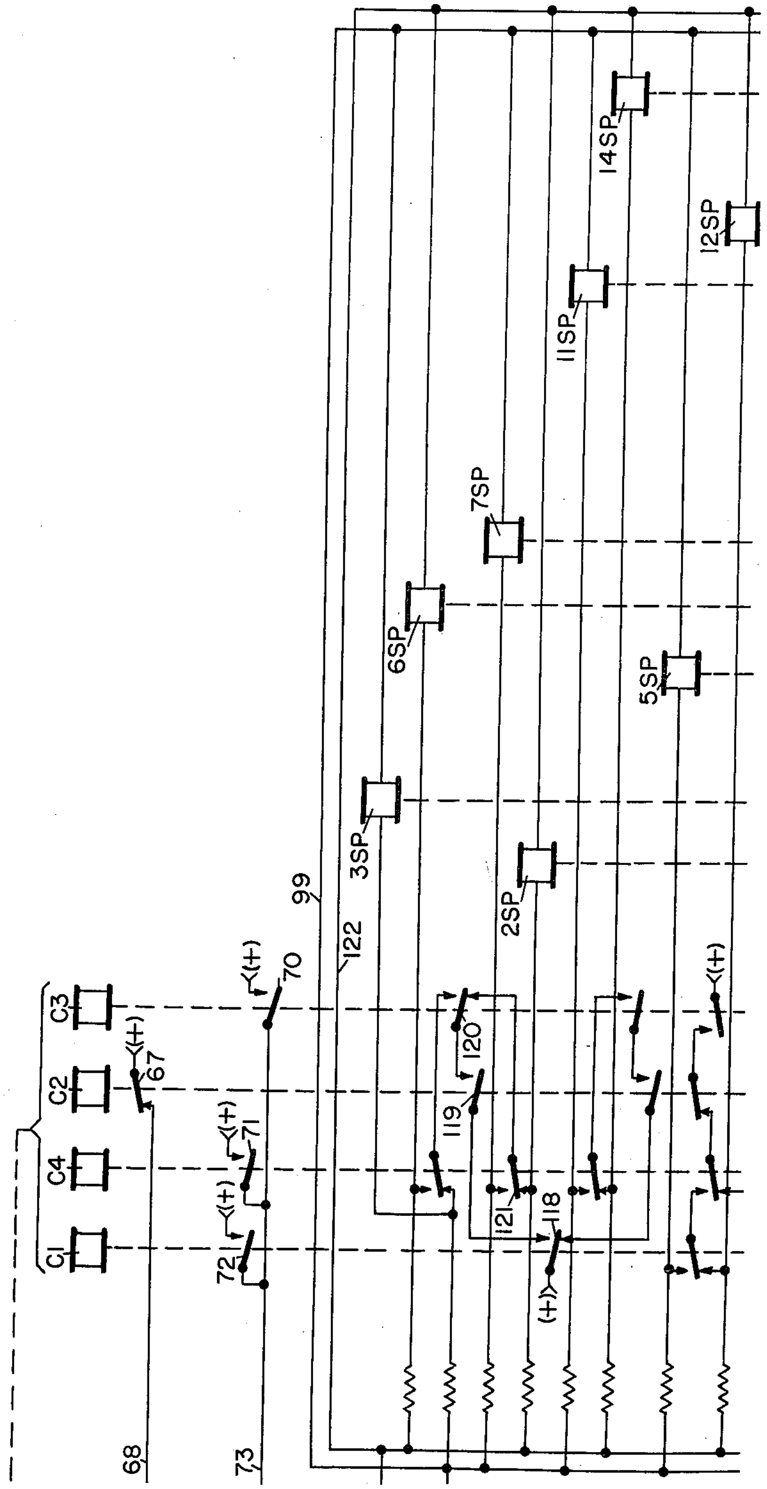

This invention relates to code communication systems, and it more particularly pertains to the communication part of a centralized traffic control system for railroads.

In a centralized traffic control system for railroads, railway traffic over an extensive stretch of track is controlled from a central control office, there being several remotely spaced field stations along the trackway at which power track switch and signaling devices are located, along with other switch and signal control apparatus, for governing railway traffic. The intelligent designation by an operator at a control office of controls for the different devices, including track occupancy detection devices, is dependent upon the operator being informed by indications registered on a control panel as to the conditions of the devices at the several field stations. Under conditions of heavy traffic particularly, the conditions of the several devices at the several field stations may change rapidly and under some conditions simultaneously, and thus in order to keep an operator at the control office well posted as to changing conditions, it is necessary that the indications be transmitted to the control office without delay. The code communication apparatus most commonly employed in centralized traffic control systems has the capacity for communicating indications from only one of the field stations to the control office at one time. This results in a material delay under heavy traffic conditions in indicating changes in conditions of the devices at the several field stations.

According to the present invention, a system is provided for the communication of indications from all of the field stations having new indications to transmit simultaneously. All indications are communicated over a common communication channel, each station transmitting its indications by distinctive energies such as by different carrier frequencies.

Rather than requiring separate step counting means at the control office for receiving the indications on the several frequencies from the field stations during a single cycle of operation, a single counter and associated control apparatus is employed according to the present invention for receiving indications from all of the field stations simultaneously.

The timing of the step periods for the communication of indications is accomplished by normally inactive local timing means, such as timing oscillators, at the respective field stations and at the control office which are set into operation substantially simultaneously upon initiation of an indication cycle. It is provided, however, that the timing devices are initiated only at the field stations that have starts registered for transmission of indications, and thus control means is provided wherein all field stations not having indication starts initially are locked out until the end of a cycle. The stepping and timing means is maintained inactive at such locked out stations while a cycle is in progress.

The locking out of field station starts which might break into an indication cycle already in progress is accomplished by normally applying distinctive energization to an indication communication channel at the control office as by energization at a distinctive carrier frequency. The reception of this distinctive frequency is required at each field station in order that such field station may initiate an indication cycle. Such energization is removed during a cycle and is also used in the initiation of the timing devices at the field stations that have indication starts initiated.

An object of the present invention is to employ indication receiving apparatus at the control office including a common step counter that is operable to receive from several field stations simultaneously and register indications in accordance with indication codes received from the several stations.

Another object of the present invention, upon initiation of an indication cycle, is to initiate step timers simultaneously at only the field stations having indication starts registered.

Another object of the present invention is to employ the removal of carrier energization of an indication communication channel at the control office during an indication cycle as a means for preventing a start of an indication field station to transmit while a cycle of operation for the communication of indications is in progress.

Other objects, purposes and characteristic features of the present invention will be in part obvious from the accompanying drawings and in part pointed out as the description of the invention progresses.

Figures 1C, 3:
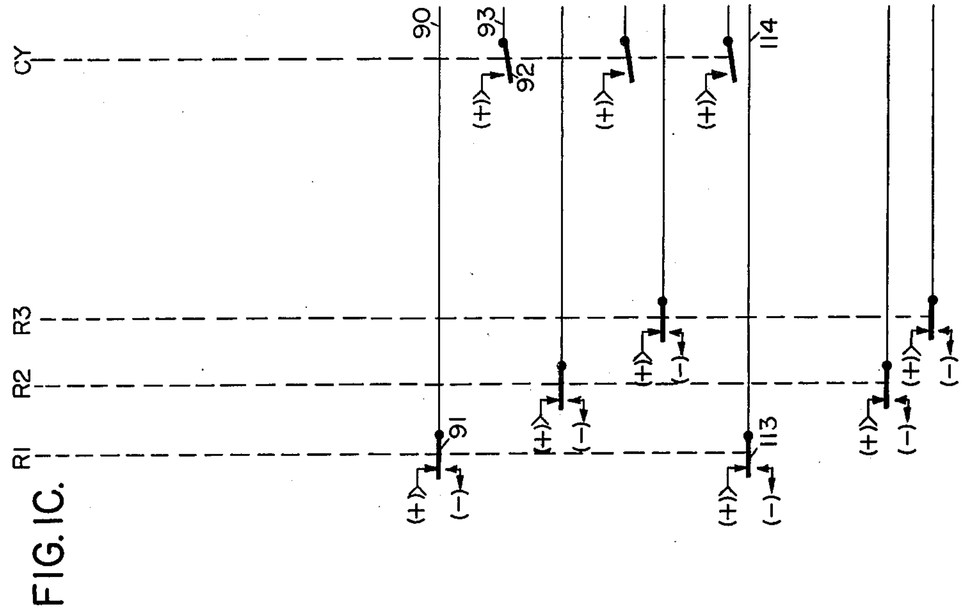
Figure 1D:
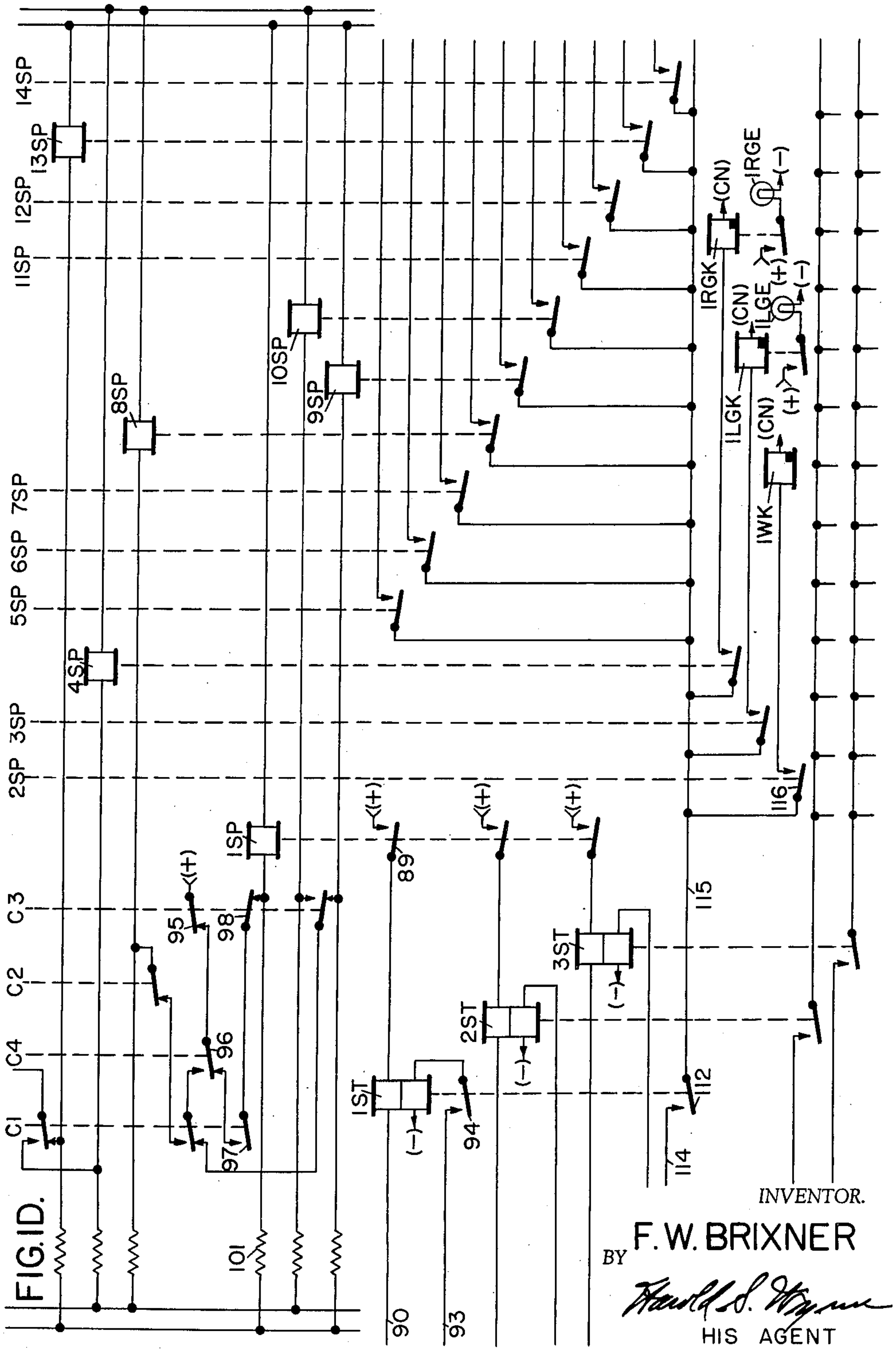
Figure 2A:
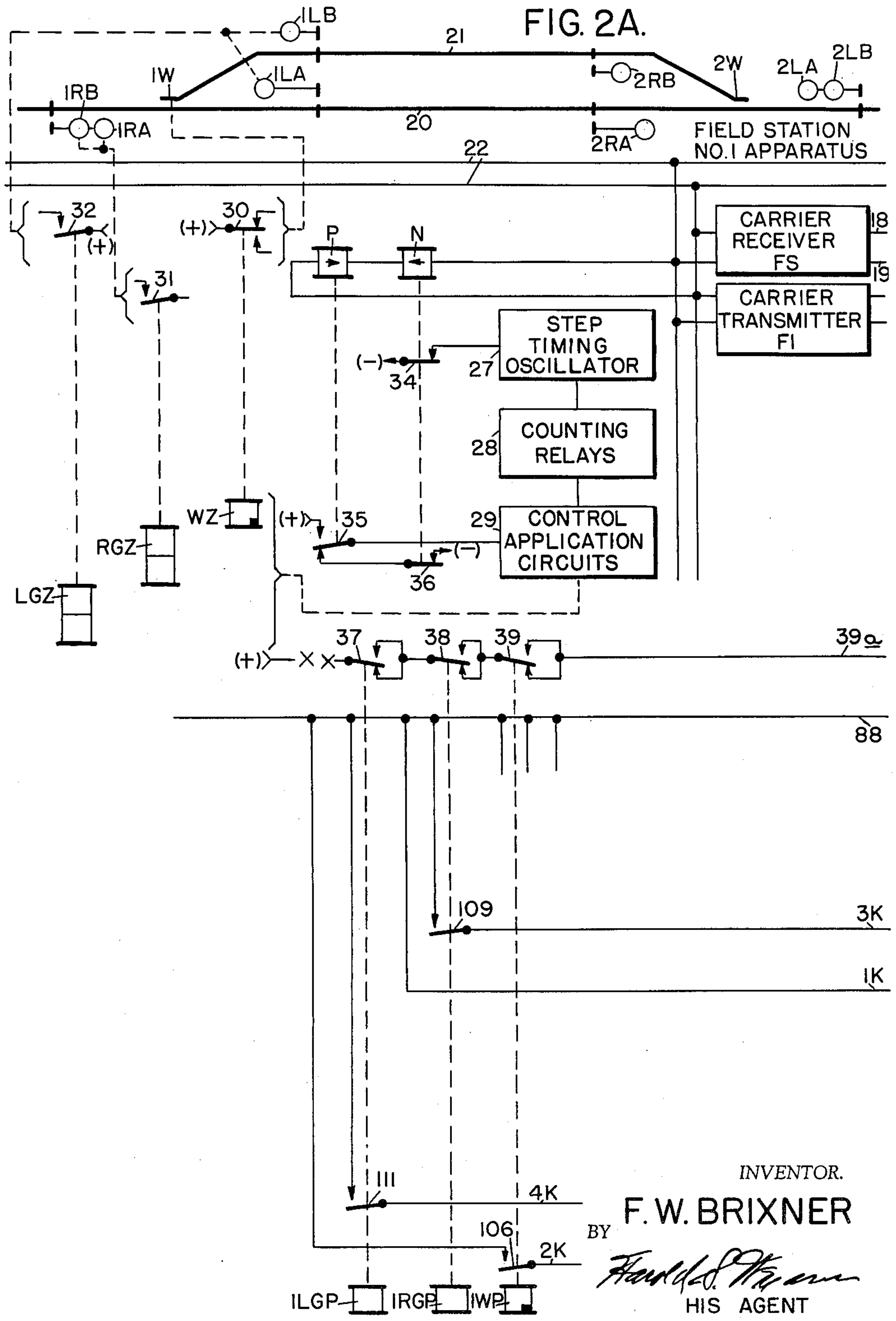
Figure 2B:
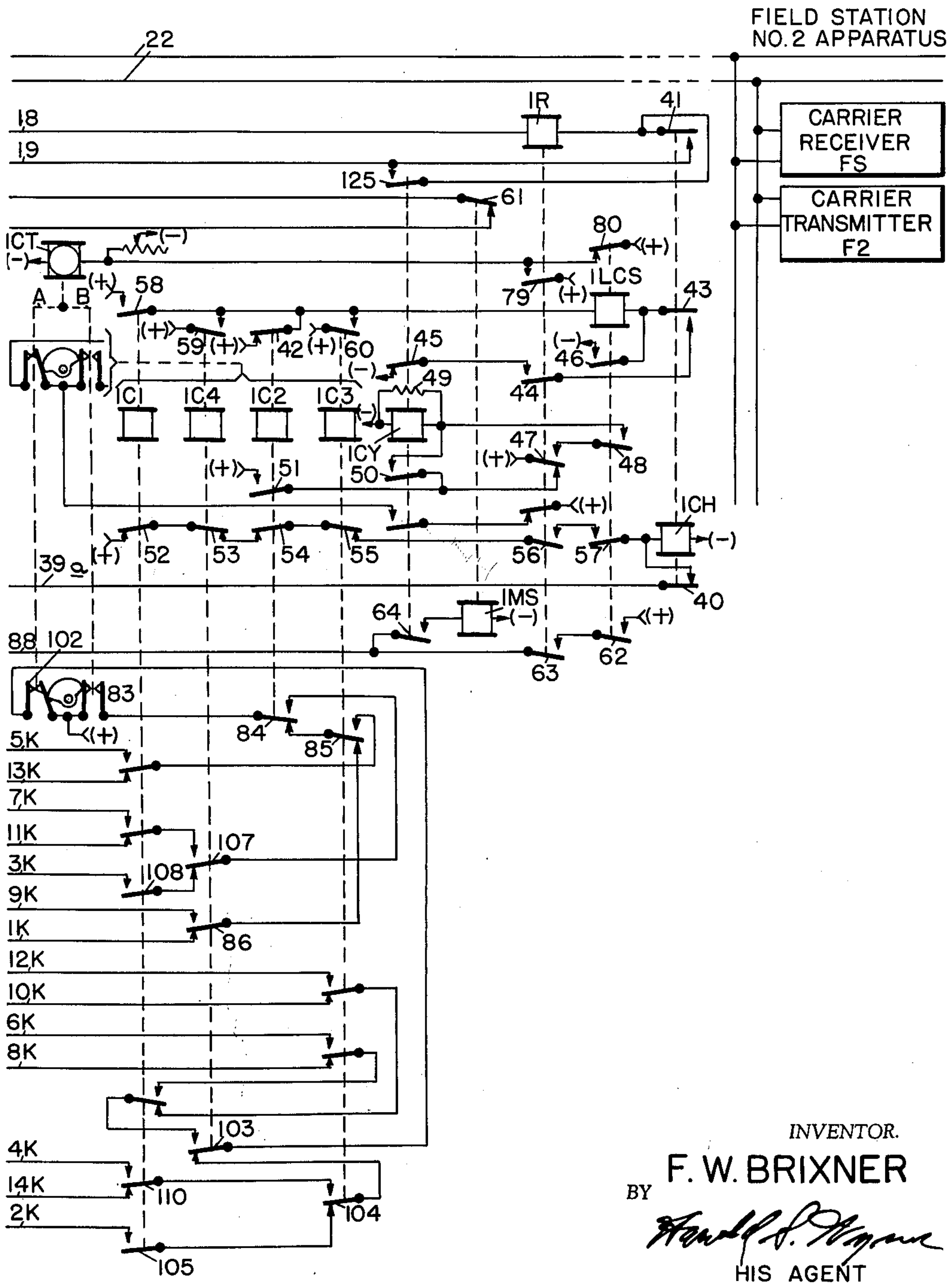

In describing the invention in detail, reference is made to the accompanying drawings in which similar letter reference characters have been used to designate parts having similar features or functions and in which:

FIGS. 1A and 1B when placed side by side above FIGS. 1C and 1D respectively illustrate control office apparatus of a centralized traffic control system employing one embodiment of the present invention;

FIGS. 2A and 2B when placed side by side illustrate typical field station apparatus for one embodiment of the present invention for the reception of control codes and the transmission of indications codes; and, FIG. 3 is a counting sequence table showing the sequence of operation of the counting relays for setting up their different distinctive combinations of conditions corresponding to the different steps during a cycle of operation.

The illustrations employed have been arranged to facilitate the disclosure of the invention as to its mode of operation and the principles involved rather than for the purpose of illustrating the specific construction and arrangement of parts that would be employed in practice. Thus, certain components of the apparatus are illustrated in block form, and relays and their contacts are shown in a conventional manner. The symbols (+) and (—) have been used to identify respective positive and negative terminals of suitable batteries or other sources of direct current, and the symbol (CN) has been used to indicate connection to the center tap of a suitable battery or other source of direct current. Relays having similar functions are identified by similar letter reference characters which are made distinctive by preceding numerals generally indicative of different stations, sequence of operation, et cetera. Any general reference that is made to these relays using the letter reference character without its preceding numeral is to be considered as applying to any of the relays having such letter reference character and a preceding numeral.

For the purpose of simplifying the disclosure of the present invention, the embodiment illustrated is shown as being applied to a relatively simple track layout as shown in FIG. 2A that may be considered as being a typical part of an extensive track layout. The track layout illustrated in FIG. 2A comprises a stretch of single track 20 having associated therewith a passing siding 21 connected to track 20 by track switches 1W and 2W at the respective left-hand and right-hand ends thereof. Eastbound signals 1RA and 1RB are provided for governing eastbound traffic through the track switch 1W, and the signals 1LA and 1LB are provided for governing westbound traffic through this switch. Similarly, the signals 2RA and 2RB are provided for governing eastbound traffic through the track switch 2W, and the signals 2LA and 2LB are provided for governing westbound traffic through this track switch. The signals at the left-hand end of the passing siding 21 are at field station No. 1, and the signals at the right-hand end of passing siding 21 are at field station No. 2.

A pair of line wires 22 connect the control office with the field stations in a manner to maintain a continuous connection whereby the wires may also be used for telephone communication or for other purposes in accordance with the requirements of practice.

Control transmitting apparatus is provided at the control office as is illustrated in FIG. 1A including positive and negative code transmitting relays PC and NC respectively, a line battery LB, a step timing oscillator 23, counting relays 24 and station and switch and signal control code selecting apparatus 25. A suitable low pass filter 26 is employed to connect the direct current code transmitting apparatus to the line wires 22.

Indication code communication apparatus is provided at the control office including a carrier transmitter FS, a carrier receiver F1 for receiving from field station No. 1, carrier receiver F2 for receiving from field station No. 2, etc., one carrier receiver being provided for each of the field stations.

A line receiving relay R is provided at the control office for each of the field stations, and a line receiving relay R is provided at each of the field stations for receiving energy applied to the line wires 22 at the control office by carrier transmitter FS.

Indication code communication apparatus is also provided at the control office and at each of the field stations comprising a code oscillator CT having contacts actuated alternately at a predetermined rate when the oscillator is rendered active, a cycle marking relay CY, and a binary step counting bank of relays including relays C1, C2, C3 and C4. The binary counting relays C are driven through a cycle of operation by the oscillator CT at the associated station, and these relays are operable in different combinations to count 15 successive steps by a sequence of operation as is indicated in the code table of FIG. 3.

A cycle repeater relay CYP is provided at the control office for use in initiating the code oscillator CT at the control office.

Step repeater relays SP are provided at the control office for repeating the respective steps counted by the step counting relays C, one step repeater relay SP being provided for each of the steps.

A station relay ST is provided at the control office for each of the field stations for the purpose of registering as to whether or not the associated station is transmitting during an indication cycle.

Suitable indication relays such as the magnetic stick relays 1WK, 1LGK and 1RGK are provided at the control office for the several field stations. These magnetic-stick relays are distinctively actuated in accordance with the reception of indication codes at the control office which are transmitted by the associated field stations. These relays are magnetically maintained in their last actuated position, and they have suitable indication devices associated therewith such as the indicator lamps 1RGE and 1LGE which distinctively indicate the conditions corresponding to the controlled devices in the field. Other indicating devices (not shown) indicate the conditions of occupancy of portions of the trackway at the several field stations.

Control receiving apparatus is provided at each of the field stations as is typically illustrated relative to field station No. 1 in FIG. 2A comprising positive and negative polar responsive relays P and N respectively, which are distinctively responsive to positive and negative pulses communicated over the line wires 22 from the control office, a step timing oscillator 27, counting relays 28, and control application circuits 29. Signal application relays LGZ and RGZ are governed by the control application circuits 29 for controlling the signals at field station No. 1, and similarly a magnetic stick relay WZ is provided for controlling the track switch 1W through its contact 30 in accordance with control codes that are received at field station No. 1. Relay RGZ when picked up causes the clearing of signal 1RA or 1RB upon the closure of front contact 31, dependent upon the position of the track switch 1W, and the relay LGZ when picked up is effective by the closure of front contact 32 to cause the clearing of signal 1LA or 1LB, dependent upon the position of the track switch 1W.

The indication code communication apparatus at the typical field station No. 1 also includes a carrier receiver FS for receiving the carrier frequency generated by the transmitter FS at the control office.

A carrier transmitter F1 is provided at field station No. 1 for transmitting a carrier frequency to the control office characteristic of that particular field station. It is to be understood that similar carrier transmitters for transmitting different frequencies are provided at the several other field stations.

Each of the field stations has a normally energized indication start relay CH, and an associated start control relay LCS. A mark-space relay MS is provided at each of the field stations for keying the carrier transmitter at the associated station in accordance with indication codes to be transmitted.

With reference to FIG. 2A, a switch repeater relay 1WP is provided for repeating the actual positions of the track switch 1W, and relays 1LGP and 1RGP are provided for repeating the clear or stop indication displayed by the respective westbound and eastbound signals provided at field station No. 1 for governing traffic over the track switch 1W.

Having thus described the general organization of the apparatus for one embodiment of the present invention, more specific consideration of this apparatus will now be given with respect to the mode of operation under certain typical operating conditions.

*Communication of Controls*

To consider first the mode of operation for the communication of controls, it will be assumed that an operator desires to transmit controls to field station No. 1 for setting up a route through the track switch 1W at the left-hand end of the passing siding 21. To initiate transmission to this field station, he actuates start pushbutton PB (see FIG. 1A) and closes contact 33 which is effective to initiate a control cycle. Similar pushbuttons (not shown) are provided to initiate transmission to the other field stations. In accordance with the actuation of the start pushbutton PB, the step timing oscillator 23 is initiated, and the initiation of the control cycle at the control office is effective to pole change the line circuit and thus cause the relay NC to be dropped away and the relay PC to become picked up to actuate the line relay P at field station No. 1 (see FIG. 2A) to its picked up position. The line relay N becomes actuated to its dropped away position. Similarly the line relay P is picked up and the associated relay N is dropped away at each of the other field stations. The dropping away of the line relay N at field station No. 1 initiates the step timing oscillator 27 by the opening of front contact 34, and a similar mode of operation is effective to initiate the oscillator at each of the other field stations.

In accordance with the step timing oscillators being initiated at all stations for a control cycle, and at the control office, the control counting relays at all stations and at the control office become active substantially simultaneously to count the steps of the control cycle. The line relays PC and NC at the control office (see FIG. 1A) are selectively energized during the several steps of the control cycle to apply selectively (+) and (—) pulses through their pole changing contacts to the line wires 22 through the low-pass filter 26 in accordance with conditions of code selecting apparatus 25 which selects first a station selecting code, and then a code indicative of the switch and signal controls that have been designated by positioning switch and signal control levers (not shown). After all of the steps have been taken during the control cycle, the control counting relays are restored to their normal positions, and the control step timing oscillators are energized at all stations to render them inactive and to condition them for initiation of the next control cycle.

At field station No. 1, the dropping away of the line relay (see FIG. 2A) upon initiation of the control cycle is effective by the opening of front contact 34 to deenergize the step timing oscillator 27 to initiate a control cycle at that field station. As the code is received during the cycle, the relays P and N are selectively energized in accordance with whether the code characters are of positive or negative polarity, and accordingly the selective closure of front contacts 35 and 36 of relays P and N respectively at field station No. 1 selects the application of positive or negative energization to the control application circuits 29 so as to distinctively actuate the application relays and control the track switch and signals at field station No. 1 in accordance with the control codes that are received from the control office. The code is received first at the field stations identifying the particular field station being called, and after station selection, the application relays, such as the relays WZ, RGZ and LGZ at field station No. 1 are selectively controlled.

*Communication of Indications*

The general mode of operation of the system in the communication of indications from the field stations to the control office is that a distinctive carrier frequency is normally applied to the line circuit at the control office by the carrier transmitter FS (see FIG. 1A), and the carrier transmitters at each of the field stations are normally effective to apply their respective distinctive frequencies to the line circuit and maintain the relays R for the corresponding stations at the control office normally energized.

The start of an indication cycle is registered at a field station by the dropping away of the change relay CH such as by the opening of the stick circuit for the normally energized relay 1CH (see FIG. 2B) at field station No. 1. This relay is normally maintained energized by a circuit extending from (+), including contact 37 of relay 1LGP, contact 38 of relay 1RGP, contact 39 of relay 1WP, wire 39*a*, front contact 40 of relay 1CH, and winding of relay 1CH, to (—). The shifting of either of the contacts 37, 38 or 39 in response to a change of an associated switch or signal device interrupts the stick circuit for relay 1CH and causes this relay to become dropped away. A start for recheck of the indications can be initiated if contacts are inserted in the circuit first described for relay CH at the points indicated in FIG. 2A as "XX." These contacts would be operated by a distinctive control communicated from the control office.

The dropping away of relay 1CH at field station No. 1 for initiating a cycle of operation causes the picking up of the relay 1R in response to the frequency transmitted from the control office by the carrier transmitter FS in accordance with the connection of relay 1R through back contact 41 of relay 1CH and wires to the carrier receiver FS, which in turn is normally energized over the line wires 22 from the control office.

Upon the picking up of relay 1R, a pick-up circuit is closed for relay 1LCS extending from (+), including back contact 42 of relay 1C2, winding of relay 1LCS, back contact 43 of relay 1CH, front contact 44 of relay 1R, and back contact 45 of relay 1CY, to (—). The picking up of this relay closes a stick circuit at front contact 46 shunting contacts 43, 44 and 45 out of the circuit just described.

Relay 1LCS when picked up closes a pick-up circuit for relay 1CY extending from (+), including front contact 47 of relay 1R, front contact 48 of relay 1LCS and winding of relay 1CY, to (—). The relay 1CY is made slow to drop away by having its winding shunted by a suitable resistor 49 in order to bridge the cross-over time of the contact 47 in shifting from the pick-up circuit just described to a stick circuit including back contact 47 of relay 1R and front contact 50 of relay 1CY. Front contact 51 of relay 1C2 is also connected in multiple with back contact 47 of relay 1R in the stick circuit for relay 1CY, thus maintaining the relay 1CY in its picked up position throughout the entire indication cycle.

The picking up of relay 1LCS also closes a pick-up circuit for relay 1CH so as to restore this relay to its normally energized position. Relay 1CH is picked up at this time through back contacts 52, 53, 54 and 55 of the counting relays 1C1, 1C4, 1C2 and 1C3 respective, front contact 56 of relay 1R and front contact 57 of relay 1LCS. The relay 1LCS is maintained picked up throughout the cycle by the connection of front contacts 58, 59 and 60 of relays 1C1, 1C4 and 1C3 respectively and back contact 42 of relay 1C2 in multiple.

In response to the picking up of the cycle relay 1CY in the initiation of an indication cycle the relay 1MS is picked up to cause the removal of the carrier normally applied to the line wires 22 by the carrier transmitter F1 upon opening back contact 61. The pick up circuit by which the relay 1MS is energized at this time includes front contact 62 of relay 1LCS, front contact 63 of relay 1R and front contact 64 of relay 1CY.

Having removed carrier energy for the frequency F1 from the line wires 22 the relay R1 at the control office (see FIG. 1A) becomes dropped away and the dropping away of this relay causes the picking up of the cycle relay CY at the control office by the energization of a circuit including back contact 65 of relay R1 and front contact 66 of relay CYP. It will be readily apparent that relay CY is similarly energized in response to a start made by any other station.

The relay CYP is normally energized by a circuit extending from (+) including back contact 67 of relay C2 (see FIG. 1B), wire 68, back contact 69 of relay CY and winding of relay CYP, to (—). Upon the picking up of relay CY, stick circuits are closed for maintaining this relay picked up throughout the indication cycle. One of these circuits includes back contact 67 of relay C2, wire 68, and front contact 69 of relay CY. Another stick circuit for relay CY includes front contacts 70, 71 and 72 of relay C3, C4 and C1 connected in multiple, energy from either of these contacts energizing the relay CY through wire 73 and front contact 74 of relay CY.

The normal energization of the line wires 22 by the carrier transmitter FS at the control office is in accordance with the closure of a circuit including front contact 75 of relay CYP and back contact 76 of relay CY. Thus the picking up of relay CY causes the carrier FS to be removed from the line circuit as a means for causing the simultaneous initiation of the code oscillator CT at all of the field stations having had their relays CH dropped away to initiate an indication cycle. The picking up of relay CY is also effective at the control office, by the opening of back contact 69, to cause the dropping away of relay CYP. Relay CYP is made slightly slow to release in order to insure that relay CY will be fully energized when picked up. Relay CYP deenergizes the oscillator CT which is normally energized through front contacts 77 of relay CYP connected in multiple with back contact 78 of relay CY.

At the field station No. 1, the carrier receiver relay 1R (see FIG. 2B) becomes dropped away upon removal of carrier current at the frequency FS, and the dropping away of this relay deenergizes the oscillator 1CT by the opening of front contact 79. Back contact 80 of relay 1LCS that is connected in multiple with contact 79 of relay 1R is already open at this time. A similar mode of operation is effective at any other field stations having simultaneous indication starts, but it will be noted that the oscillators CT will remain energized at any field stations not having had their relays LCS picked up. In other words, at field stations which have not had their relay CH dropped away for initiating transmission of indications, the relays LCS remain in their dropped away positions, and the oscillators CT at these stations are maintained energized through circuits comparable to the circuit shown in FIG. 2B for the energization of relay 1CT through back contact 80 of relay 1LCS.

The deenergization of the oscillators CT at the control office and at all of the field stations having indication starts is thus rendered effective substantially simultaneously, and the oscillatory motion of each of the oscillators CT closes contact groups A and B alternately at measured time intervals to effect the actuation of the associated bank of counting relays C1–C4 through different permutations to count the steps of the cycle sequentially according to the counting sequence table of FIG. 3.

Upon initiation of the oscillator CT at the control office, the closure of contacts 179 (see FIG. 1A) of the oscillator CT for the first time in the cycle causes the picking up of the relay C1 as is indicated in FIG. 3 by the application of energy to wire 180. When the contacts 81 are next closed by the oscillator CT, the second step is taken by the picking up of relay C2 as is illustrated in FIG. 3 in accordance with the application of energy to wire 82. Similarly the stepping relays C are actuated through their permutations as is illustrated in FIG. 3, with only one relay being actuated either to a picked up or a dropped away position to form each of the steps as the stepping progresses.

At field station No. 1, the relay 1MS is picked up for the transmission of a space character during the first step of the indication cycle in accordance with the energization of a circuit extending from (+), including contact 83 of oscillator 1CT, back contact 84 of relay 1C2, back contact 85 of relay 1C3, back contact 86 of relay 1C4, wire 1K, space bus 88, front contact 64 of relay 1CY and winding of relay 1MS, to (−). Thus even though the circuit originally described for the energization of relay 1MS is opened at front contact 63 of relay 1R upon removal of the carrier transmitted by the transmitter FS at the control office, the relay 1MS is picked up for the first step to remove carrier frequency F1 from the line wires 22 to register field station No. 1 as being one of the field stations that is transmitting indications during the indication cycle.

From the above described mode of operation it will be readily apparent that a space character is always transmitted during the first step at every field station that is transmitting indications during the indication cycle, and that a mark character is transmitted by each field station that has not initiated a cycle because of its relay MS being maintained in a normal dropped away position.

At the control office, the condition as to whether the carrier is removed or not by the various field stations is registered by the condition during the first step of the relays R1, R2, R3, etc. for the various field stations (see FIG. 1A. For each field station that is to transmit indications, the relay R at the control office is dropped away during the first step while the relays R for the other stations are maintained normally energized. In accordance with the relay R1 being in its deenergized position during the first step, the station relay 1ST (see FIG. 1D) is picked up by the energization of a circuit extending from (+), including front contact 89 of relay 1SP, wire 90, and back contact 91 of relay R1, to (−). This relay when picked up is maintained energized throughout the cycle by a stick circuit extending from (+) including front contact 92 of relay CY, wire 93, front contact 94 of relay 1ST and winding of relay 1ST, to (−). If a start had not been initiated by field station No. 1, the relay R1 would have been maintained in its picked up position responsive to carrier of the frequency F1, and thus the winding of relay 1ST would have been shunted during the first step because of the connection of front contact 91 to the (+) terminal of the source of direct current. Thus the relay 1ST is picked up during the first step when station 1 is transmitting, but if station 1 is not transmitting, this relay is maintained deenergized throughout the cycle.

The step repeater relay 1SP, which controls the energization of the station relays ST, is energized only during the first step, this relay being picked up in response to the picking up of the counting relay C1 upon the energization of a circuit extending from (+), including back contact 95 of relay C3, back contact 96 of relay C4, front contact 97 of relay C1, back contact 98 of relay C3, winding of relay 1SP, odd bus wire 99 and contact 100 of oscillator C1, to (−). The circuit for relay 1SP is opened upon the opening of contacts 100 of the oscillator CT, and after being dropped away, the relay 1SP is maintained deenergized for the remainder of the cycle of operation. Relay 1SP has its winding shunted by the resistor 101 so that the drop away time of the relay 1SP is made comparable to its pick up time in order to provide for an uniform indication execution control period during each step. It will be noted that a contact of the relay 1SP is included in the pick up circuit for the station relay ST that is provided for receiving from each of the field stations, thus providing that a station relay ST can be picked up only during the first step of a cycle. The picking up of the station relay ST during the first step of the cycle is a requisite for controlling the magnetic stick indication relays in accordance with the codes received during the subsequent steps.

At field station No. 1, as the stepping progresses, the carrier transmitter F1 is keyed by the mark-space relay 1MS on the respective steps in accordance with the condition of the devices to be indicated during such steps.

If the relay 1WP is in its dropped away position in accordance with the normal position of the track switch 1W, a mark is transmitted during the second step because there is no connection of the channel wire 2K to the space bus 88 for the energization of relay 1MS. Thus the relay 1MS will be maintained deenergized during the second step and the carrier transmitter F1 will be effective to transmit during that step. If the track switch 1W is in its reversed position, however, the relay 1WP becomes picked up, and the relay 1MS becomes energized during the second step for the transmission of a space character in accordance with energy being applied to the space bus 88 through an "A" contact 102 of oscillator 1CT, back contact 103 of relay 1C4, back contact 104 of relay 1C3, front contact 105 of relay 1C1, wire 2K, and front contact 106 of relay 1WP to the space bus 88.

Similarly, during the third step, a mark or a space character is transmitted in accordance with whether the relay 1RGP (see FIG. 2A), which is indicative of the condition of the signals governing eastbound traffic, is in its picked up or dropped away position. If this relay is in its deenergized position, no energy is applied to the space bus 88 during the third step, but if this relay is picked up, energy is applied to the space bus 88 by a circuit including contact 83 of oscillator 1CT, front contact 84 of relay 1C2, back contact 107 of relay 1C4, front contact 108 of relay 1C1, wire 3K and front contact 109 of relay 1RGP.

A mark or a space character is transmitted during the fourth step in accordance with whether the relay 1LGP is in its dropped away or picked up condition indicative of the condition of the signals at field station No. 1 for governing westbound traffic. A mark is transmitted during the fourth step unless the relay 1LGP is picked up to close a circuit for energization of the space bus 88 through contact 102 of oscillator 1CT, back contact 103 of relay 1C4, front contact 104 of relay 1C3, front contact 110 of relay 1C1, wire 4K and front contact 111 of relay 1LGP.

It is to be understood that other devices to be indicated would be connected to other channel wires K in a similar manner to that which is illustrated for the indication of the position of devices as has been described, the reference characters K being identified by preceding numerals indicative of the numbers of the steps during which such wires are energized.

Subsequent to the registration of the various stations transmitting indications at the control office during the first step, the magnetic stick indication relays belonging to the stations transmitting are conditioned as the stepping progresses in accordance with the respective indication codes transmitted by the different stations. Thus for registration of the indications transmitted by field station No. 1, for example, the relay 1ST is picked up during the first step as has been described, and because of the closure of its front contact 112, the magnetic stick indication registration of indications for field station No. 1 are rendered subject to actuation to one position or another as the stepping progresses in accordance with the condition of the contact 113 of the receiving relay R1 during the associated step. More specifically, if a mark character is received during the second step of the cycle, the relay 1WK is energized with one polarity by a circuit extending from (+), including front contact 113 of relay R1, wire 114, front contact 112 of relay 1ST, indication bus wire 115, front contact 116 of relay 2SP and winding of relay 1WK, to (CN). If a space character is transmitted during the second step of the cycle by field station No. 1 rather than a mark character as has been considered, relay 1WK becomes energized with the opposite polarity in accordance with the closure of back contact 113 of relay R1 because of removal of carrier energy of the frequency F1 during that particular step.

As the stepping progresses at the control office, a different step repeater relay SP is picked up for each step. The step repeater relay SP for each step is dropped away a time interval before the relay SP for the following step is energized. Thus there is no possibility of having two relays SP in their picked up positions at the same time, and furthermore, there is a time interval between the steps wherein no SP relay is picked up during which a shift can be made in the position of the carrier receiver relays R in accordance with the new code element being received.

The relay 1SP (see FIG. 1D), for example, has its pickup circuit deenergized by the opening of contact 100 of the oscillator CT at the end of the first step, and at the same time, the shifting of the oscillator contacts closes a pick-up circuit (not shown) for relay C2. The time of drop away of relay 1SP is comparable to pick up time of relay C2 so that relay 1SP becomes dropped away substantially at the same time that relay C2 becomes picked up. The picking up of relay C2 is essential to the energization of the next step repeater relay 2SP (see FIG. 1B), and the relay 2SP does not therefore become picked up until a time interval after the dropping away of relay 1SP substantially equal to the pick up time of relay 2SP. During this time interval, the line receiving relays R at the control office for the various field stations are positioned in accordance with the code characters transmitted from the different field stations during the second step after relay 1SP has been dropped away and after relay C2 has been picked up, but before the relay 2SP has had time to become picked up. The pick-up circuit by which relay 2SP is energized at this time extends from (+), including front contact 118 of relay C1, front contact 119 of relay C2, back contact 120 of relay C3, back contact 121 of relay C4, winding of relay 2SP, wire 122 and contact 123 of oscillator CT, to (−).

The above described relative timing of operation is facilitated by adjusting the relative starting times of the control office and the field station oscillators CT so that the starting of the control office oscillator CT slightly lags the starting of the field station oscillators CT. One manner in which this time lag may be provided is illustrated in FIG. 1A wherein the winding of the oscillator CT is shunted by a suitable variable resistor 124. It will be readily apparent that the start of the oscillator CT could also be delayed by providing additional drop away time for the relay CYP which actually deenergizes the oscillator CT at the control office. It is to be understood that a similar adjustable timing means is provided for the control of initiation of the oscillators CT at the various field stations to compensate for line propagation times and the like that might have a bearing upon the synchronization of the stepping at the several field stations.

Having thus described specifically the circuit organization for the energization successively of the step repeater relays 1SP and 2SP for the steps 1 and 2 respectively, it should be readily apparent that the circuits are organized to provide a similar mode of operation for the successive energization of the step repeater relays SP for each of the other steps to be taken during an indication cycle of operation.

As the stepping progresses, energy of one polarity or the other is selectively applied to the indication bus wire 115 (see FIG. 1D) in accordance with the code element received, and this energy feeds through front contacts of the relays SP belonging to the respective steps to selectively actuate magnetic stick indication relays controlled on the associated steps in a manner comparable to that which has been described for the selective energization of the relay 1WK in accordance with the picking up of the relay 2SP.

If it is assumed that the stepping has progressed through the fourteen steps of an indication cycle, the opening of the "A" contacts of the oscillators CT at the beginning of the fifteenth step at the control office and at the field stations that have been transmitting causes the deenergization at the control office and at each field station of the counting relay C3, and upon the dropping away of this relay at the indication stations that have been transmitting, prior to the dropping away of the relay C2, the relay LCS at the associated station becomes dropped away because of the removal of stick energy. With reference to FIG. 2B, for example, all of the count relays C are in their dropped away positions at this time except the relay 1C2 and thus the contacts 58, 59, 42 and 60 are all open and the relay 1LCS becomes dropped away. The dropping away of this relay closes a circuit at back contact 80 to energize the oscillator 1CT, this oscillator continues its oscillatory motion until it rotates to a position to open the "B" contacts and close the "A" contacts and to be rotated against a suitable latching stop (not shown) with the "A" contacts closed.

Upon the opening of the "B" contacts for the last time during the cycle, the relay 1C2 becomes dropped away, and the closure of its back contact 42 conditions a pick-up circuit for the relay 1LCS so that this relay can be picked up upon the initiation of a subsequent cycle.

At the beginning of the fifteenth step, the relay 1MS becomes dropped away, if this relay has been picked up for the last step, and is thus restored to its normal position. In accordance with the closure of back contact 61 of relay 1MS at this time, carrier energy at the frequency F1 is transmitted to the control office, and upon its reception at the control office, the line relay R1 (see FIG. 1A) which is responsive to this frequency is energized, and is maintained in its energized position during the period of rest. Similar restoration is effected for the receiver relay R provided for each of the other field stations that has been transmitting.

The counting relays at the control office are restored to normal in a manner comparable to that which has been described with reference to operation at a typical field station in that the relay C3 is dropped away at the beginning of the fifteenth step and the relay C2 is dropped away upon opening of the "B" contacts of the oscillator CT at the control office for the last time. The dropping away of relay C3 at the control office causes the dropping away of the relay CY by the opening of front contact 70 (see FIG. 1B) of relay C3. Relays C1 and C4 are already dropped away at this time, and the relay C2 is maintained in its picked up position until the "B" contacts of the oscillator CT are open for the last time. After the relay C2 at the control office becomes dropped away, relay CYP is restored to its normally energized position because of energy applied at back contact 67 of relay C2.

Upon the picking up of relay CYP, the carrier transmitter FS is again rendered active to complete restoration to the normal conditions of the indication communication apparatus at the control office wherein the carrier is transmitted from the control office over the line wires 22 to provide energy at the respective field stations that can permit the initiation of a subsequent indication cycle by any of the field stations.

When the line circuit becomes energized again by the carrier transmitter FS as has been described, the code receiving relays R at each of the field stations that has been transmitting is picked up momentarily to release the relay CY at the associated station. At field station No. 1, for example, relay 1CY is maintained picked up at this time by its stick circuit including back contact 47 of relay 1R and front contact 50 of relay 1CY. Because of the relay 1CY being in its picked up position, the relay 1R is subject to energization in response to the control office carrier frequency FS because of the front contact 125 of relay 1CY being connected in multiple with back contact 41 of the relay 1CH. Thus the relay 1R becomes picked up, and upon the picking up of this relay, the opening of back contact 47 of relay 1R causes the dropping away of relay 1CY. Relay 1CY in dropping away causes the dropping away of relay 1R by opening front contact 125 unless a second start has been initiated by the start relay 1CH having been dropped away.

It will be noted from the above described circuit organization than if the control office transmitted carrier energy at a frequency FS is not present when a start is initiated at any field station that is transmitting, the relay CH at that station remains dropped away to initiate operation of a second indication cycle. Such initiation can be rendered effective as soon as the relay CY becomes dropped away at the end of the first cycle to condition a circuit for the picking up of relay LCS for initiation of a new cycle of operation.

Although only 14 steps are shown as being used for an indication cycle, it is to be understood that an additional step may be used under certain conditions where there are only single stations for each of the different locations. It will be noted according to FIG. 3 that the counting relays C are operable to sixteen different permutations, but the sixteenth step is not used as this step calls for all of the relays C to be in their dropped away positions. This is the normal condition of the step counting relays C.

Having thus described one embodiment of a multiple station code communication system as applied to the communication of controls and indications between a control office and a plurality of field stations in a centralized traffic control system for a relatively simple track layout, it is desired to be understood that this system may be used for different types of track layouts and different types of control systems, and that various adaptations, alterations and modifications may be applied to the specific form shown to meet the requirements of practice within the scope of the appending claims.

What I claim is:

1. A normally inactive code communication system operable in cycles when rendered active for the communication from remotely spaced field stations to a control office station of indications of conditions of a plurality of devices at each of the field stations, each of the cycles comprising several successive steps in a predetermined order provided for the communication of code characters during the several steps indicative of the condition of a different device at a given field station during each of several successive steps comprising in combination;

(*a*) a communication channel connecting the stations, (*b*) stepping means at each of the stations operable when initiated at the beginning of a cycle to count a predetermined number of successive step periods constituting the cycle, (*c*) transmitting means at each of the field stations including a carrier transmitter for applying steady energy at a different carrier frequency for each field station to the communication channel when the system is inactive, (*d*) said transmitting means at each of the field stations including means responsive to a change in the condition of any said devices at that field station to remove steady energy from the communication channel for initiating the system into a cycle of operation and for rendering said stepping means active at the control office station and at the associated field station, (*e*) said transmitting means being effective when initiated to transmit a code characteristic of the condition of a different device at the associated field station during each of several successive steps, (*f*) indication code receiving means at the control office including a receiving relay for each of the field stations for receiving only code characters communicated at the frequency generated by said transmitting means at the associated field station, and (*g*) indication registering means at the control office governed by said receiving relays and said stepping means for registering indications received simultaously from several filed stations.

2. A code communication system according to claim 1 wherein the stepping means includes a bank of relays operable in different permutations to count the steps according to a binary system of counting.

3. A code communication system according to claim 1 wherein the indication registering means at the control office includes contacts of station relays for the several stations and means is provided for registering at the control office whether or not the several field stations are transmitting in accordance with whether or not the station relay for that station has been actuated during a predetermined step of each indication cycle.

4. A code communication system according to claim 3 wherein circuit means is provided at the control office for picking up the station relays for the several stations during the same step at the beginning of a cycle, provided that a particular character is received during that step.

5. A code communication system according to claim 4 wherein registration of indications received at the control office from the several stations is dependent upon the station relay for the associated station being in its picked up position.

6. A normally inactive code communication system operable in cycles when rendered active for the communication from remotely spaced field stations to a control office station of indications of conditions of a plurality of devices at each of the field stations, each of the cycles comprising several successive steps in a predetermined order for the communication of code characters during the several steps indicative of the condition of a different device at a given field station during each step comprising in combination;

(a) a communication channel connecting the stations, (b) a carrier current transmitter at the control office normally operable when the system is inactive to steadily energize said communication channel at a distinctive frequency, (c) normally inactive stepping means at each of the stations including a normally inactive timing device for timing and counting a predetermined number of steps constituting a cycle of operation, (d) cycle initiating means at each of the field stations operable to transmit a distinctive character over the communication channel to the control office in response to a change in the condition of one of said devices, (e) means at the control office operable upon the reception of said distinctive character for interrupting the transmission of steady carrier energy from the control office to the field stations, and (f) means at each of the field stations for rendering said timing device at that station active upon failure to receive carrier current over said communication channel from the control office station only provided that said cycle initiating means is operated at the associated station.

7. A code communication system according to claim 6 wherein the timing device is an oscillator having a torsional pendulum.

8. A code communication system according to claim 7 wherein the oscillator includes magnetic means for normally rendering the associated oscillator inactive.

9. A normally inactive code communication system operable in cycles when rendered active for the communication from remotely spaced field stations to a control office station of indications of conditions of a plurality of devices at each of the field stations, each of the cycles comprising several successive steps in a predetermined order provided for the communication of code characters during the several steps indicative of the condition of a different device at a given field station during each step comprising in combination;

(a) a communication channel connecting the stations, (b) stepping means at each of the stations operable when initiated at the beginning of a cycle to count a predetermined number of successive step periods constituting the cycle, (c) indication transmitting means at each of the field stations including a carrier transmitter for applying steady energy at a distinctive carrier frequency to the communication channel when the system is inactive, (d) said indication transmitting means at each of the field stations including means responsive to a change in the condition of any one of said devices at that field station to initiate a cycle of operation of the communication system by removing said carrier energy and to subsequently transmit a code characteristic of the condition of a different device at the associated station during each of several successive steps of said stepping means, (e) a step repeater relay at the control office station for each of the steps, (f) circuit means for operating said step repeater relays successively responsive to the operation of said stepping means, (g) indication code receiving means at the control office station including a receiving relay for each of the field stations responsive only to the energy communicated at the carrier frequency generated by said transmitting means for the associated station for receiving an indication code, and (h) indication registering means at the control office station governed by said code receiving means for registering simultaneously indications received from several field stations, (i) said indication registering means at the control office station including a separate circuit network for each of the stations and each of the circuit networks including contacts of said step repeater relays and being energized only at times when said receiving relay for the associated field station is energized.

10. A code communication system according to claim 9 wherein the step repeating relays have their windings shunted by resistors respectively whereby the drop away times of the relays are made comparable to their pick up times.

11. A code communication system according to claim 9 wherein the stepping means includes a bank of relays operable to count the steps according to a binary system of counting.

References Cited in the file of this patent

UNITED STATES PATENTS

| | | |
|---|---|---|
| 2,816,218 | Rees | Dec. 10, 1957 |
| 2,907,980 | Preston | Oct. 6, 1959 |